(No Model.) 3 Sheets—Sheet 1.

R. M. & W. J. LAWRENCE.
FIFTH WHEEL.

No. 343,039. Patented June 1, 1886.

Witnesses. Inventors.

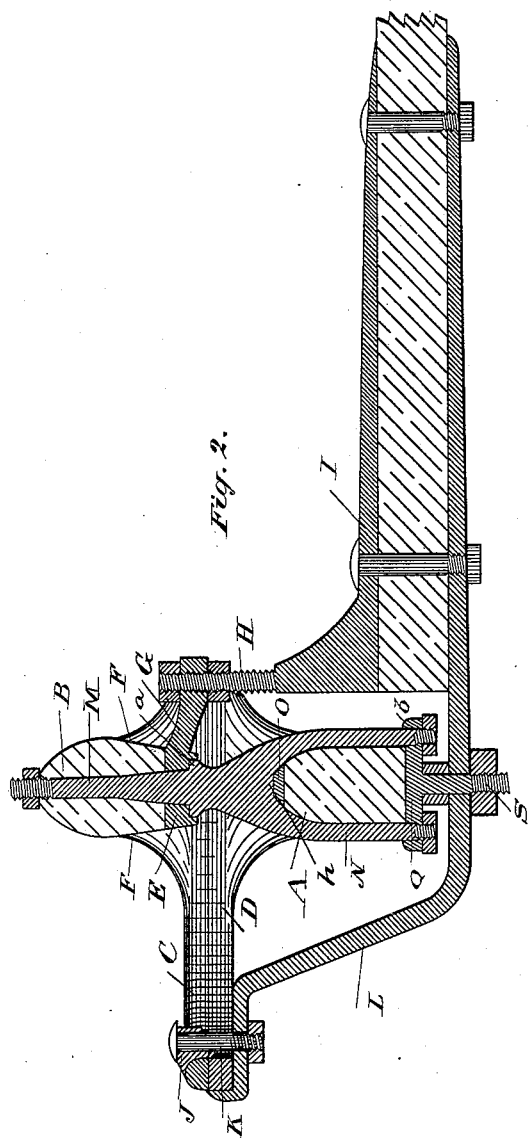

(No Model.) 3 Sheets—Sheet 3.

R. M. & W. J. LAWRENCE.
FIFTH WHEEL.

No. 343,039. Patented June 1, 1886.

Witnesses.
James E. Mayhee
Chas H. Riches

Inventors.
R. M. Lawrence
W. J. Lawrence
by Donald C. Ridout & Co
Attys

UNITED STATES PATENT OFFICE.

ROBERT MERCER LAWRENCE AND WILLIAM JOHN LAWRENCE, OF BRADFORD, ONTARIO, CANADA.

FIFTH-WHEEL.

SPECIFICATION forming part of Letters Patent No. 343,039, dated June 1, 1886.

Application filed November 4, 1885. Serial No. 181,823. (No model.)

*To all whom it may concern:*

Be it known that we, ROBERT MERCER LAWRENCE and WILLIAM JOHN LAWRENCE, both of the village of Bradford, in the county of Simcoe, in the Province of Ontario, Canada, carriage manufacturers, have jointly invented certain new and useful Improvements in Circles for Buggies and other Vehicles, of which the following is a specification.

The object of the invention is to design a circle for buggies and other vehicles which will not spread or shift its position, and can be attached in position without making holes in the axle-bed, and in which any slack is readily taken up; and it consists, essentially, of solid tie-plates arranged to connect the ends of each half of the circle and to fit against the head-block and axle-bed, and are connected to the axle-bed by axle-clips, adjusting-screws, and braces, being arranged substantially as and for the purpose hereinafter specified.

Figure 1:
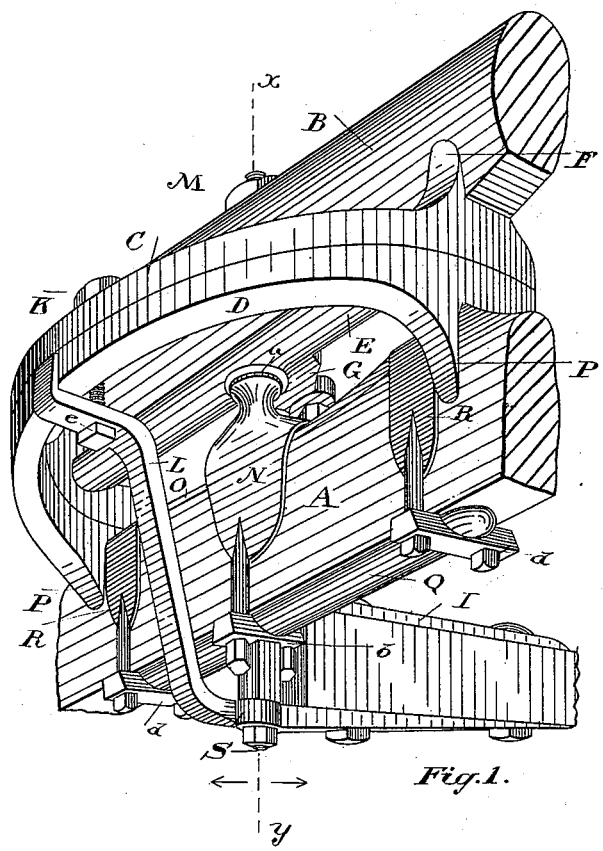
Figure 6:
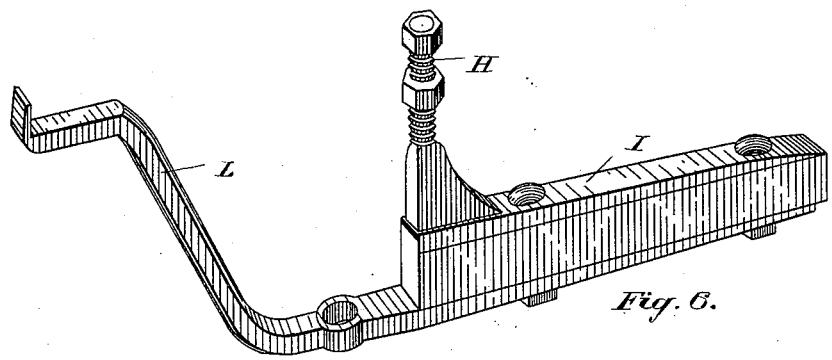
Figure 3:
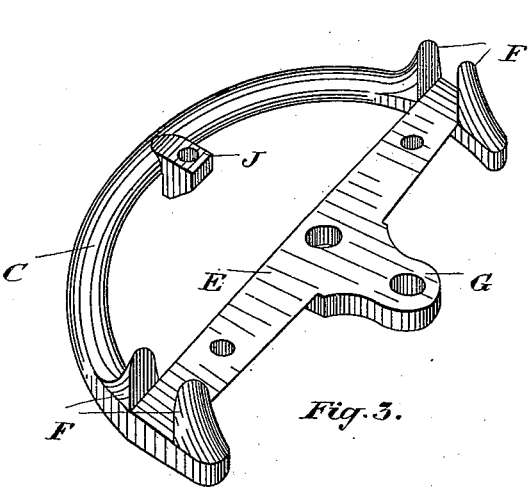
Figure 5:
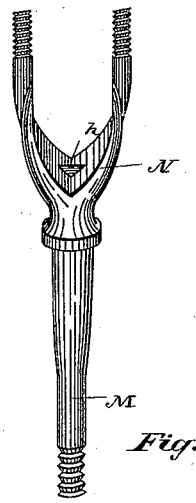
Figure 7:
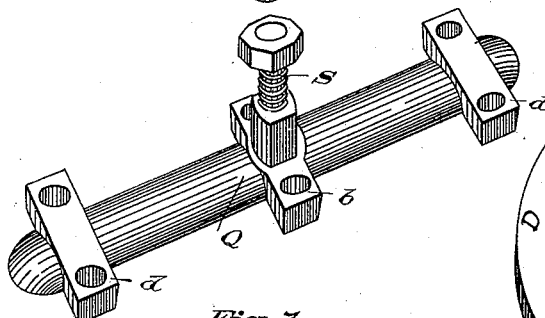
Figure 4:
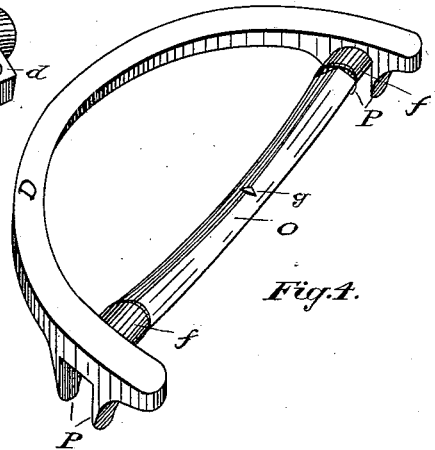

Figure 1 is a perspective view of our improved buggy-circle complete. Fig. 2 is a section through $x\,y$. Fig. 3 is a perspective detail of the upper half of the circle. Fig. 4 is a perspective detail of the lower half of the circle. Fig. 5 is a perspective detail of the king-bolt and clip. Fig. 6 is a perspective detail of the reach-brace. Fig. 7 is a detail of the tie-plate for the bottom of the axle.

A represents the axle-bed, and B the head-block.

C is the upper half of the circle, and D the lower half of the circle.

It will be noticed that the ends of the upper half of the circle, C, are connected by a plate, E, made solid with the ends at a point where the jaws F, to receive the head-block, are formed. A lug, G, projects from the center of the plate E, and has a hole in it to receive the bolt H, which extends from and is connected to the top reach-brace, I.

On the center of the upper half of the circle, C, an inwardly-projecting lug, J, is formed, and which projects below the top of the lower half, D, of the circle. A hole is made in this lug J, through which the bolt K passes, and is screwed into a hole made in the bottom reach-brace, L, by which the two halves of the circle are held together, a jamb-nut, $e$, being added. The inwardly-projecting lug J serves as a guide to prevent either half of the circle from getting out of position.

M is a king-bolt, which is attached to and forms part of the clip N, which fits over the plate O, employed to connect the two ends of the lower half, D, of the circle. This plate extends from and is attached to the said circle at the point where the lugs P extend to fit over the axle A, as indicated. On the top of the clip N, at the point where the king-bolt M extends, a collar, $a$, is formed and designed to fit into the recess formed in the plate E, as indicated.

Q is a tie-plate designed to fit onto the bottom of the axle-bed A, as indicated. This tie-plate has formed upon it clip-ties $b$ and $d$. The clip-tie $b$ is in the center of the tie-plate Q, and has holes through which the legs of the clip N pass. The clip-ties $d$ are at the end of the tie-plate Q, and have holes through them to receive the legs of the clips R, which pass over the plate O, and with the clip N hold the lower half of the circle securely in position, suitable nuts being, of course, provided for the clips N and R.

An under king-bolt, S, is formed on the tie-plate Q, and extends through a hole in the bottom of the reach-brace L, as indicated, where a nut is placed.

It will be noticed that the upper end of the bottom reach-brace, L, which extends below the lower half, D, of circle, projects behind and above the said circle, so as to brace it, as indicated.

With the view of preventing the plate O from shifting on the axle-bed A, we hollow out the said axle-bed, as indicated, and bend the plate O to fit the hollow thus made. We further make a recess, $f$, at each end of the plate O, at the point where the clips R fit over the said plate, which recess prevents the clips from moving, and the hollowing out of the axle-bed, as described, prevents it also from moving laterally; as in the event of there being any slackness in the clips R, they would be tightened the moment that the plate moved along the axle-bed.

With the view of preventing the king-bolt clip N from moving we form a nick or notch, $g$, in the plate O, to receive a ridge or bar, $h$, formed in the inside of the king-bolt clip N.

From this description it will be seen that the half-circles C D are securely braced by the solid cross-plates E and O, that the half-circle D is rigidly fastened to the axle-bed A without the necessity of any bolts passing through the said axle-bed, that the circle so secured will not move laterally, that the king-bolt, though resting on a metal plate on the axle-bed A will not shift on the said plate, and that any lost play between the two halves of the circle can be readily taken up.

We are aware of the patent to H. M. Beecher, No. 139,855, and make no claim to the construction shown therein as forming part of our invention.

We attach importance to our angular notch and projection, whereby the king-bolt clip is prevented from moving on the bar O.

What we claim as our invention is—

1. The combination, with the circle D and the plate O, made solid therewith and provided with an angular notch, $g$, of the king-bolt clip N, embracing said plate and having an angular ridge, $h$, to fit into said notch, substantially as and for the purpose specified.

2. The combination, with the circle C, formed with lugs F, brace-bar E, and lug G, and inwardly-extending lug J, of the top reach-brace, I, provided with bolt H, engaging the lug G, and the bottom reach-brace, L, and bolt K, engaging said brace L, and the lug J, to engage the lug G, the bottom reach-brace, L, shaped to clip the circle, and the bolt K, passed through said bottom reach-brace and lug J, substantially as and for the purpose specified.

3. The combination, with the axle A, plate O fitting a hollow made in the top of said axle, tie-plate Q, fitted to the bottom of the axle and having formed solid therewith the clip-ties $b\ d$, and king-bolt S, the clips R, having legs engaging holes in the ties $d$, and the king-bolt clip N, having formed integral therewith the king-bolt M, and legs engaging holes in the tie $b$, substantially as and for the purpose specified.

ROBERT MERCER LAWRENCE.
WILLIAM JOHN LAWRENCE.

In presence of—
WILSON B. SCOTT,
W. H. SUTHERLAND.